United States Patent
Shen (10) Patent No.: US 9,482,540 B2
(45) Date of Patent: Nov. 1, 2016

(54) NAVIGATION DISPLAY METHOD AND SYSTEM

(71) Applicant: Harman Becker Automotive Systems GmbH, Karlsbad-Ittersbach (DE)

(72) Inventor: Kelei Shen, Durlach (DE)

(73) Assignee: HARMAN BECKER AUTOMOTIVE SYSTEMS GMBH, Karlsbad (DE)

( * ) Notice: Subject to any disclaimer, the term of this patent is extended or adjusted under 35 U.S.C. 154(b) by 0 days.

(21) Appl. No.: 14/645,320

(22) Filed: Mar. 11, 2015

(65) Prior Publication Data

US 2015/0260534 A1  Sep. 17, 2015

(30) Foreign Application Priority Data

Mar. 12, 2014  (EP) .................................... 14159166

(51) Int. Cl.
*G01C 21/34* (2006.01)
*B60K 35/00* (2006.01)
*G02B 27/01* (2006.01)

(52) U.S. Cl.
CPC ............... *G01C 21/34* (2013.01); *B60K 35/00* (2013.01); *G02B 27/01* (2013.01); *B60K 2350/2052* (2013.01); *B60K 2350/2056* (2013.01); *B60K 2350/962* (2013.01); *G02B 2027/0141* (2013.01)

(58) Field of Classification Search
CPC ...... G01C 21/34; G02B 27/01; B60K 35/00; B60K 2350/962; B60K 2350/2056; B60K 2350/2052
USPC .......................................................... 701/408
See application file for complete search history.

(56) References Cited

U.S. PATENT DOCUMENTS

| | | | |
|---|---|---|---|
| 5,115,398 A | 5/1992 | De Jong | |
| 6,285,317 B1 | 9/2001 | Ong | |
| 7,489,303 B1 * | 2/2009 | Pryor | B60K 35/00 345/173 |
| 8,521,411 B2 | 8/2013 | Grabowski et al. | |
| 2007/0048084 A1 * | 3/2007 | Jung | G09F 9/30 404/9 |

(Continued)

FOREIGN PATENT DOCUMENTS

| | | |
|---|---|---|
| DE | 102007058295 A1 | 6/2009 |
| DE | 102008060766 A1 | 9/2009 |
| GB | 2504311 A | 7/2012 |

OTHER PUBLICATIONS

Angelos Amditis, Towards the Automotive HMI of the Future: Overview of the AIDE-Integrated Project Results, IEEE Transactions on Intelligent Transporation Systems, vol. 11, No. 3 Sep. 2010, pp. 567-578.

(Continued)

*Primary Examiner* — McDieunel Marc
*Assistant Examiner* — James E Stroud
(74) *Attorney, Agent, or Firm* — Artegis Law Group, LLP (57) ABSTRACT

A light pattern is projected onto the front glass in a position where the light pattern appears to be projected onto or in close proximity to a corresponding specific real-world object when viewed by an operator in the operating position and/or a graphic pattern is superposed on a graphic or video image of the real-world objects in front of the vehicle in a position where the graphical pattern appears to be on or in close proximity to the image of the corresponding specific real-world object on a screen, wherein the light pattern and/or graphic pattern has a light wavelength that changes in accordance with the distance between the vehicle and the specific real-world object.

24 Claims, 7 Drawing Sheets

(56) References Cited

U.S. PATENT DOCUMENTS

| | | | | |
|---|---|---|---|---|
| 2008/0211779 A1* | 9/2008 | Pryor | ............. | G01C 21/3664 |
| | | | | 345/173 |
| 2010/0253493 A1* | 10/2010 | Szczerba | ............. | G01S 13/723 |
| | | | | 340/435 |
| 2014/0184643 A1* | 7/2014 | Friend | ............. | G09G 3/003 |
| | | | | 345/633 |
| 2014/0192181 A1* | 7/2014 | Taylor | ............. | B60C 23/0408 |
| | | | | 348/118 |

OTHER PUBLICATIONS

Anup Doshi, A Novel Active Heads-Up Display for Driver Assistance, IEEE Transactions on Systems, Man and Cybernetics—Part B: Cybernetics, vol. 39, No. 1 Feb. 2009, pp. 85-93.

International Search Report for Application No. EP 14 15 9166, dated Jun. 23, 2014.

\* cited by examiner

NAVIGATION DISPLAY METHOD AND SYSTEM

CROSS-REFERENCE TO RELATED APPLICATIONS

This application claims priority to European application no. 14 159 166.9, filed Mar. 12, 2014, titled "Navigation Display Method and System," hereby incorporated herein by reference.

TECHNICAL FIELD

The disclosure relates to a system and method for displaying navigation information.

BACKGROUND

Electronic navigation systems implemented in automotive vehicles alleviate operators or passengers of the vehicles from the task of finding the best route to a destination. Such systems are particularly useful in regions unfamiliar to the operator, in that they allow for the avoidance of the tedious task of map interpretation. However, modern navigation systems in vehicles supply a considerable amount of information to vehicle operators. This information needs to be organized and displayed for quick access by the vehicle operator without overly distracting the operator's attention from the vehicle's path. Displaying information without distracting the operator's attention from the road applies in particular to navigation systems that indicate routes on a separate screen. Vehicle operators tend to focus their attention continually on the route mapped on the navigation system's screen, as opposed to the traffic conditions, with obvious risks in terms of safety. To monitor the screen, the operator typically has to look away from the road, and switching back and forth between the road and screen takes time for the operator's eyes to adapt to different focal lengths.

Heads-up displays have become increasingly popular in vehicle navigation and information systems. In heads-up displays, an electronic image of the route information is projected onto the front glass (windshield) of the vehicle so the operator can read the projected information without looking away from the road. When observing the road through the windshield, unacceptable distortion of the projected images may be introduced as a result of the front glass having an extensive surface area and highly complex curved shape. Moreover, in normal driving conditions, the operator's head and eyes are subject to continual vertical and longitudinal bobbing movements induced by vibration of the car. The operator's eyes must thus constantly keep track of the position of the image projected onto the windshield, which makes monitoring of the image exhausting. This can also be confusing and frustrating, particularly when the operator must discern many similar and closely located alternatives, such as closely located driveways, complex intersections with intertwined traffic lanes, complex highway exits, etc.

In systems that display two-dimensional navigation objects such as arrows or simplified maps on the front glass, it is undesirable for such images to be presented in such a way that they appear in the operator's primary area of sight. By "operator's primary area of sight", a section of a three-dimensional space is meant that encloses the visible road ahead of the vehicle, as well as all the visible objects that are on or relatively close to the road. At the very least, such an image may be distracting or annoying to the operator. Moreover, objects presented in the operator's primary area of sight may obstruct real-world objects on the designated path that the operator needs to pay attention to in the course of normal and safe driving (for example, other vehicles, pedestrians, traffic lights and road signs).

SUMMARY

A method configured to guide a steerable vehicle through a road network, in which the vehicle has a front glass and an operating position from which an operator looking through the front glass steers the vehicle, comprises the following: determining navigation data representing the vehicle's position and travel direction; receiving from a storage object's data corresponding to real-world objects for the determined navigation data; generating a light pattern that indicates an upcoming specific real-world object on the road of current travel based on the object's data; and projecting the light pattern onto the front glass in a position where the light pattern appears to be projected onto or in close proximity to the corresponding specific real-world object when viewed by the operator in the operating position, wherein the light pattern has a light wavelength that changes in accordance with the distance between the vehicle and the specific real-world object.

A method configured to guide a steerable vehicle through a road network, in which the vehicle has a screen and an operating position from which the screen is visible by an operator steering the vehicle, comprises the following: determining navigation data representing the vehicle's position and travel direction; receiving from a storage object's data corresponding to real-world objects for the determined navigation data; generating on the screen a graphic or video image of the real-world objects in front of the vehicle; generating on the screen a graphical pattern that indicates an upcoming specific real-world object on the road of current travel based on the object's data; and superposing the graphical pattern onto the graphic or video image of the real-world objects in front of the vehicle in a position where the graphical pattern appears to be on or in close proximity to the image of the corresponding specific real-world object, wherein the graphic pattern has a light wavelength that changes in accordance with the distance between the vehicle and the specific real-world object.

A system configured to guide a steerable vehicle through a road network, in which the vehicle has a front glass and an operating position from which an operator looking through the front glass steers the vehicle, comprises the following: a vehicle position data generator configured to determine navigation data representing the vehicle's position and travel direction; a memory configured to provide object data corresponding to real-world objects for the determined navigation data; a heads-up display configured to generate a light pattern that indicates an upcoming specific real-world object on the road of current travel, based on the object's data, and to project the light pattern onto the front glass in a position where the light pattern appears to be projected onto or in close proximity to the corresponding specific real-world object when viewed by the operator in the operating position, wherein the light pattern has a light wavelength that changes in accordance with the distance between the vehicle and the specific real-world object.

A system configured to guide a steerable vehicle through a road network, in which the vehicle has a screen and an operating position from which the screen is visible by an operator steering the vehicle, comprises the following: a vehicle position data generator configured to determine navigation data representing the vehicle's position and travel direction; a memory configured to provide object data corresponding to real-world objects for the determined navigation data; wherein the screen is configured to generate a graphic pattern that indicates an upcoming specific real-world object on the road of current travel based on the object's data, and to superpose the graphic pattern on the graphic or video image in a position where the graphic pattern appears to be on or in close proximity to the corresponding specific real-world object; the graphic pattern has a light wavelength that changes in accordance with the distance between the vehicle and the specific real-world object.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following description and drawings. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
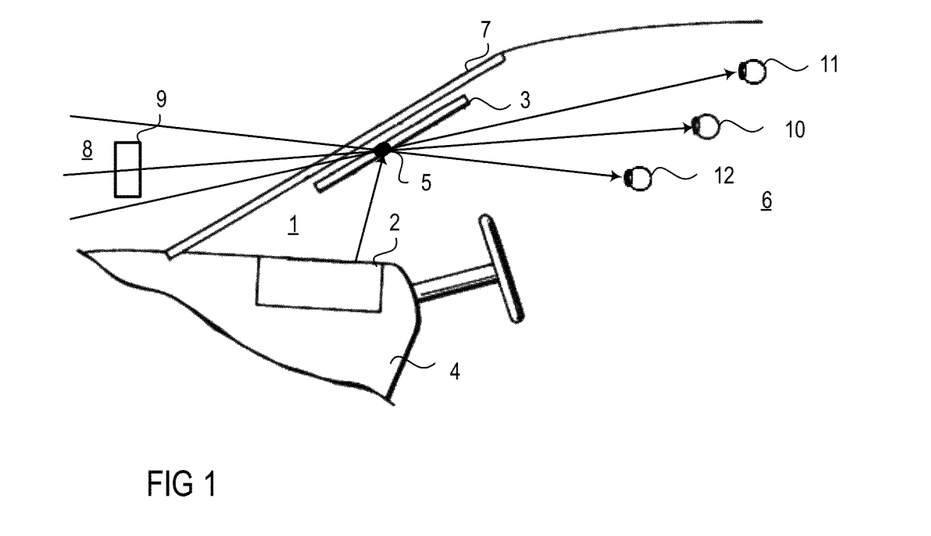
FIG. 1 is a schematic diagram of an exemplary system for displaying navigation information onto the front glass of a vehicle.

FIG. 1 shows an example of an arrangement of heads-up display arrangement 1 with light projector 2 and semi-translucent reflecting layer 3 (mirror) integrated in or attached to a front glass of a vehicle. Projector 2 is mounted in dashboard portion 4 in such a way that projector 2 is pointed upward. Pattern 5 projected onto reflecting layer 3 is reflected from layer 3 toward vehicle operator's eyes 6. Accordingly, the vehicle operator (e.g., the car driver) can view pattern 5 at a plane in the direction of front glass 7, which is symmetrical to reflecting layer 3. In a system constructed in such a way, it is possible for the operator to pay attention to scene 8 ahead of the vehicle simultaneously with projected pattern 5. When looking through front glass 7, an image is obtained in such a way that projected pattern 5 is superimposed on the actual front scene 8, including real-world object 9, e.g., a road, a building, etc. This is useful to give the operator effective information concerning scene 8 ahead of the vehicle without looking away from the road. The driver can look at front scene 8 and pattern 5 reflected onto front glass 7 by way of semi-translucent reflecting layer 3, which reflects the light from projector 2 to operator's eyes 6, and the light from front scene 8 passes through layer 5 to operator's eyes 6.

Pattern 5 (or any suitable image) generated by a computer for guidance of the vehicle may be projected onto front glass 7 so as to superimpose it with real-world scene 8 in front of the vehicle. For example, a microcomputer of a navigation device (not shown in FIG. 2) determines the current position and travel direction of the vehicle on a road map from a global positioning system (GPS). It then identifies important driver information related to the vehicle's position and travel direction in a database (such as important real world object and indicates it on heads-up display 1. This makes it possible to conduct optimal vehicle guidance in accordance with the actual front scene. For example, with such a navigation device that indicates the turning direction (left or right) at a specified crossing on a predetermined route by an arrow on heads-up display 1 when the vehicle is approaching the specified crossing, it is possible to project a pattern in the form of a turning arrow on front glass 7 to be superimposed with the crossing viewing of actual front scene 8 from operator's preferred position 10, as shown in FIG. 1.

Pattern 5 may be projected as a simple two-dimensional image in the direction of front glass 7 in such a way that it matches actual front scene 8 when the operator's eyes are in position 10. Two-dimensional image displaying methods cannot produce a sufficient three-dimensional impression of, e.g., a scene ahead of the vehicle with an accurate impression of distance or guidance at a road crossing with an accurate impression of reality, even when using perspective imaging. When the graphical image is not able to generate an impression of distance in the direction of travel (depth impression), it is important that pattern 5 exactly matches real-world object 9, which depends on the exact position of operator's eyes 6. But bumpy roads, braking actions, etc. may cause the operator's head and eyes to continually bob vertically and longitudinal bobbing movements, induced by vibration of the vehicle and resulting in at least temporarily varying seating positions 11 and 12. Different seating positions of operators with different heights may cause substantial mismatch between pattern 5 and real object 9 in such a way that there may be no sufficient depth information in critical situations. However, a distinctive impression of distance in accordance with the actual front scene is important to the operator not only to know that a certain action (e.g., a left or right turn) will become necessary, but also to know exactly when it will become necessary.

In the system shown in FIG. 1, the light pattern has a light wavelength that changes depending on the distance between the vehicle and the specific real-world object. The distance may be calculated from the vehicle's momentary position based on an electronic map, the predetermined route and the position of the real-world object of interest. The different wavelengths may be such that they are in a visible range and are perceived by the operator as different colors. The colors may change incrementally or continuously. For example, the color may be red for distances between 100 m and 50 m (e.g., far range), yellow for distances between 50 m and 10 m (e.g., intermediate range) and green for distances between 10 m and 0 m (e.g., close range). Moreover, these ranges may vary incrementally or continuously according to the speed of the vehicle. For example, the ranges given above may apply to a speed below 70 km/h. If the speed is above 70 km/h, the ranges may be such that red is for distances between 200 ml and 100 m, yellow is for distances between 100 m and 20 m and green is for distances between 20 m and 0 m. Further increments are possible, e.g., for a speed above 130 km/h, etc. So the color code gives the operator a robust impression of the distance to the point of interest such as an upcoming intersection, a U-turn, a road exit or merging lanes.

Figure 2:
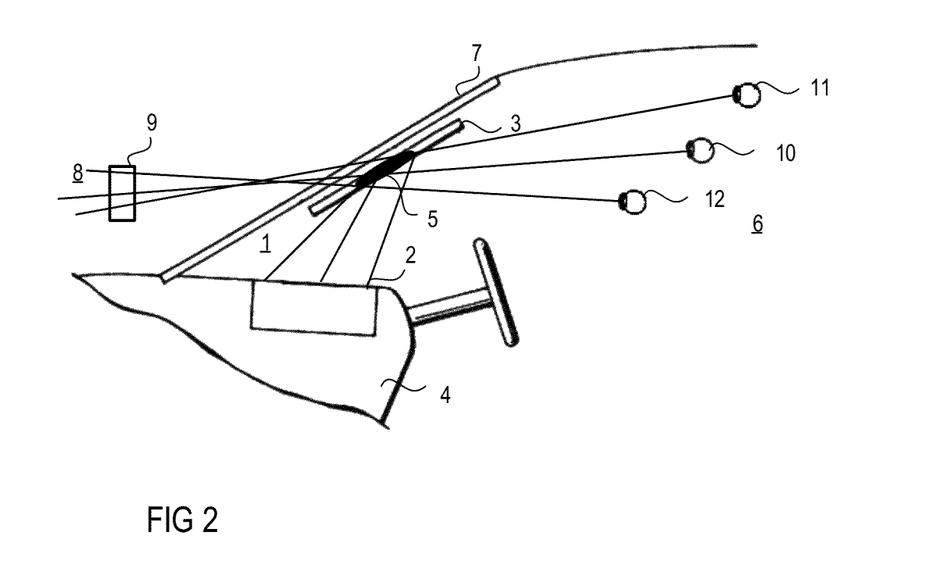
FIG. 2 is a schematic diagram of the system of FIG. 1 in which the display of navigation information is more insensitive to changes of the operator position.

With reference to FIG. 2, the light pattern may have a shape whose vertical extension is at least twice the size its horizontal extension. Such patterns may be, for example, vertically extending arrows, vertical lines, triangles whose horizontal base lines are shorter than half of their vertical altitude lines or the like. As can be seen from FIG. 2, a sufficient vertical extension of pattern 5 allows for at least a partial overlap of pattern 5 and real-world object 9 for all positions 10, 11 and 12.

Figure 3:
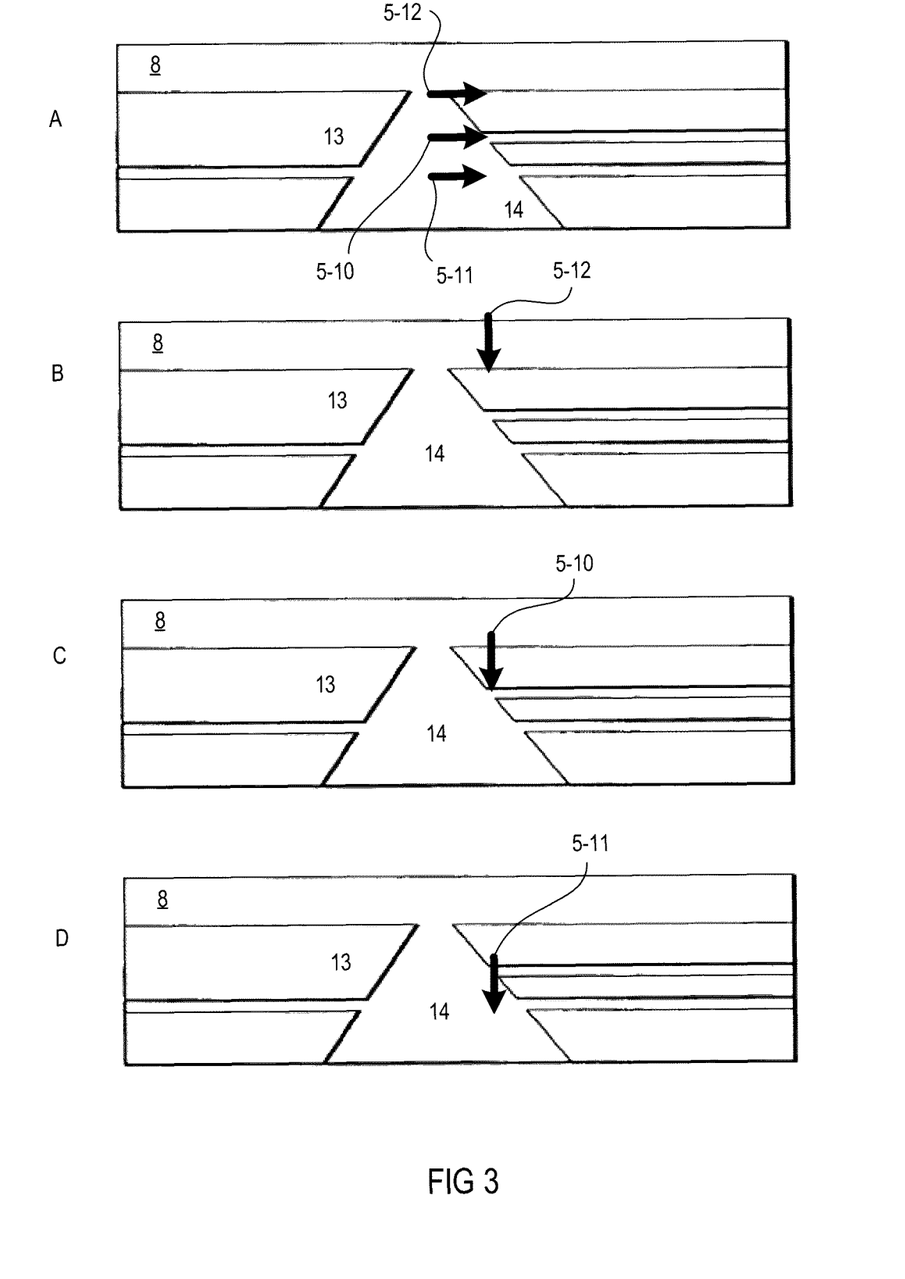
FIG. 3 is a schematic diagram comparing the influence of changes of the operator position to the display of navigation information.

FIG. 3 shows four identical perspective views of an exemplary front scene 8 with a flat landscape such as road network 13 in green fields 14 with no tall buildings, mountains, trees or the like. Two-dimensional pattern 5, which provides the directional information, is overlaid on three-dimensional front scene 8 to indicate the travel direction (right turn) for the operator when in preferred position 10 and positions 11 and 12 of FIGS. 1 and 2, as shown by arrows 5-10, 5-11 and 5-12. Arrows 5-10, 5-11 and 5-12 are horizontally aligned in the example shown in FIG. 3A. FIGS. 3B-3D show the same scene 8 for operator positions 10, 11 and 12, and right turn information is again displayed with arrows 5-10, 5-11 and 5-12, this time with the arrows vertically aligned. As can be seen, the vertically aligned arrows, even with no color coding added, are less obtrusive, less confusing and less sensitive to vertical (up and down) and longitudinal (back and forth) bobbing movements of the operator's head. Horizontal movements are commonly not an issue anyway since the operator's head is sufficiently supported in the horizontal direction by the vehicle seat's headrest.

Figure 4:
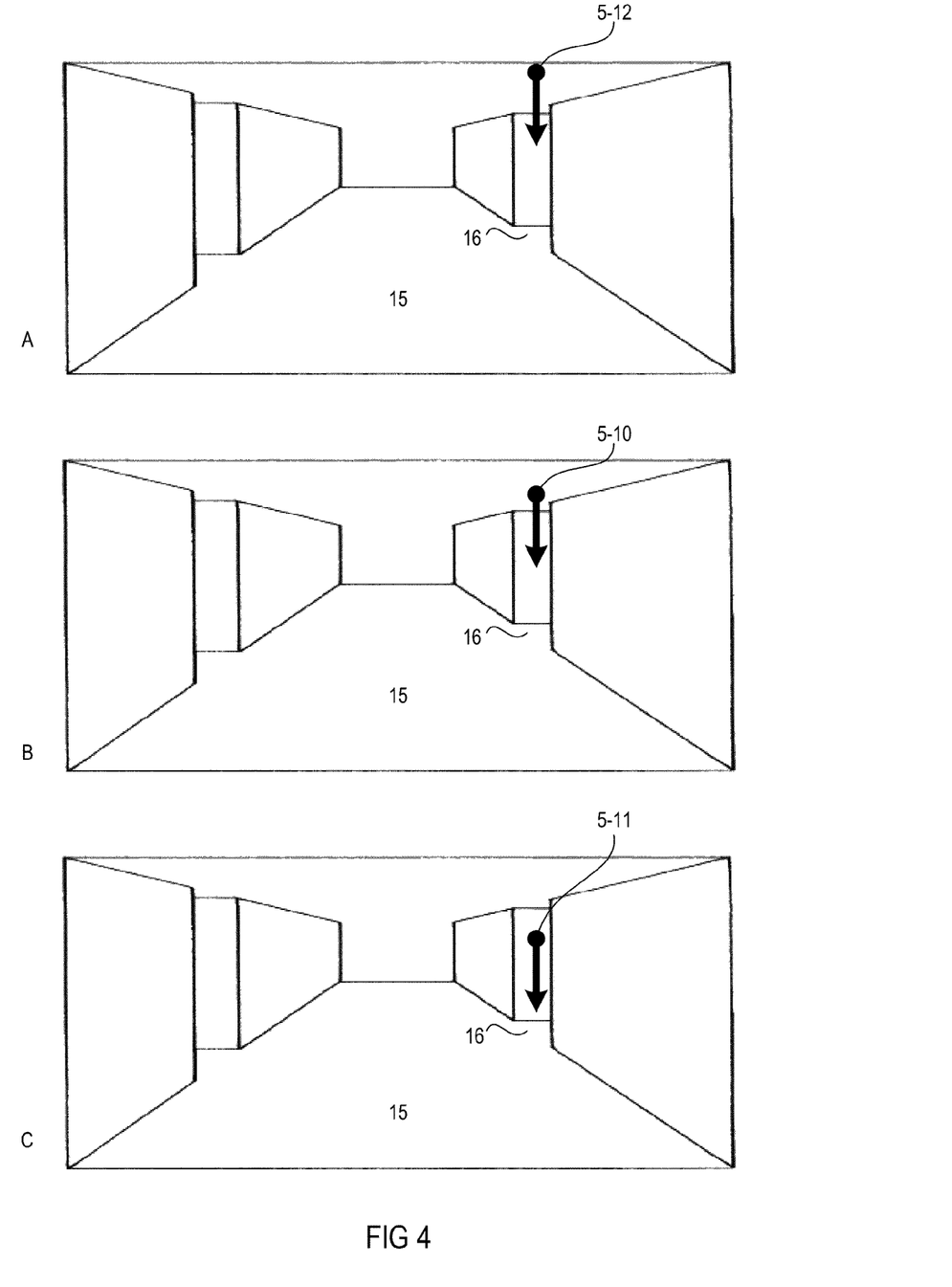
FIG. 4 is a schematic diagram illustrating an exemplary navigation situation viewed from three different operator positions.

Patterns with a predominantly vertical expansion are even better in connection with three-dimensional structured landscapes such as cities with high buildings, as schematically shown in FIG. 4. In the scene shown in FIG. 4, the vehicle drives along road of current travel 15 and intends to turn right at intersection 16. City landscapes and other scenes with strong texture tend to generate very complex and confusing front scenes, and additional patterns introduced to the image are commonly perceived as obtrusive by the operator, particularly when the operator must discern many similar and closely located alternatives, such as closely located driveways, complex intersections with intertwined traffic lanes, complex highway exits, etc. As the main directions of the vehicle are vertical or longitudinal, patterns with a predominantly vertical expansion are perceived as more clear and convenient by the operator. Furthermore, when employing patterns with a predominantly vertical expansion, varying positions of the operator's head have significantly less influence on the perception of the navigation information, as can be clearly seen in FIGS. 4A-4C, in which vertically aligned arrows 5-10, 5-11 and 5-12, which correspond to operator positions 10, 11 and 12 of FIGS. 1 and 2, are shown.

Figure 5:
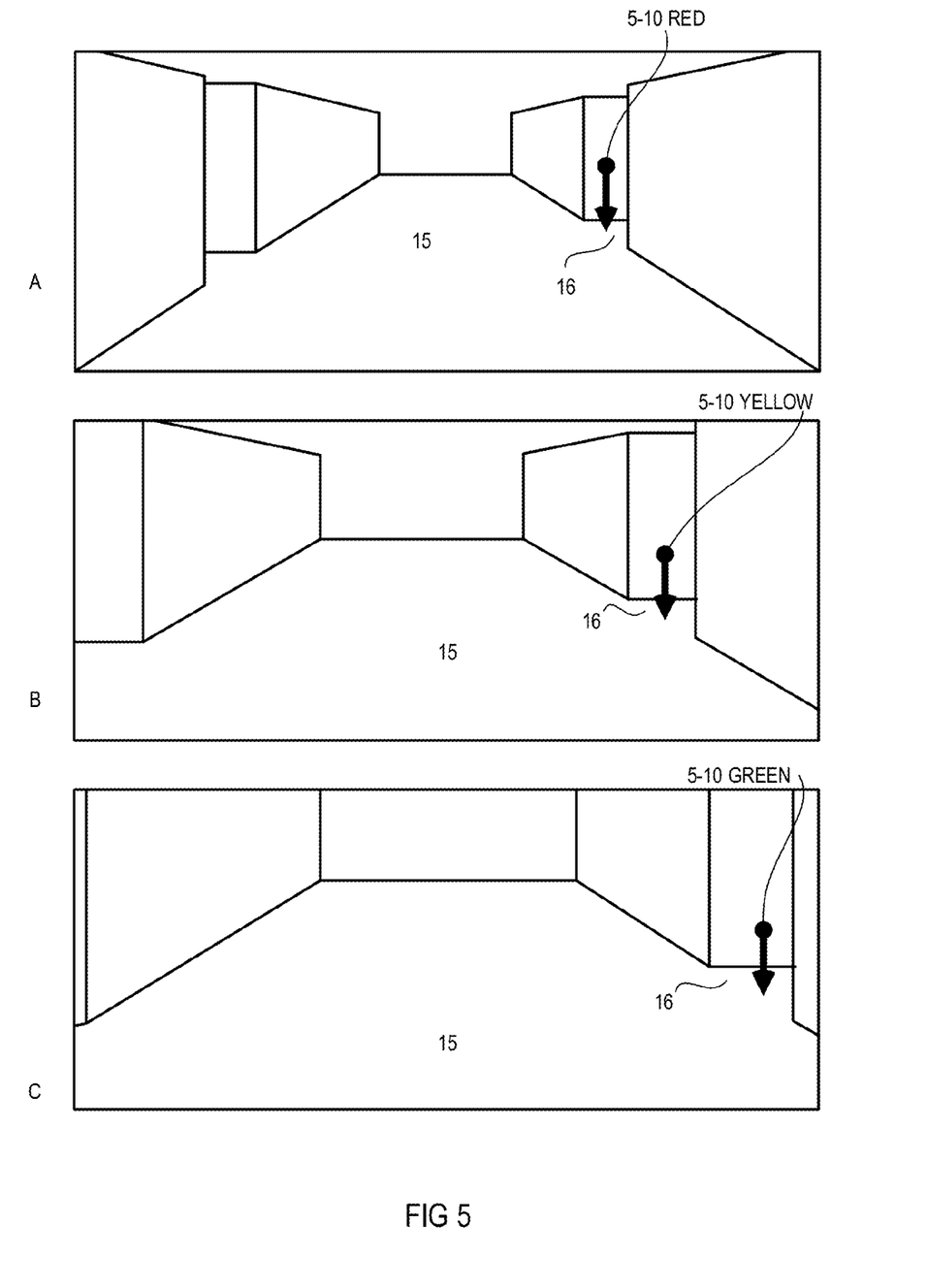
FIG. 5 is a schematic diagram illustrating the views through the front glass of a vehicle that approaches an intersection at three different distances from the intersection.

When adding distance color coding to vertically extending patterns, valuable information is added without deteriorating the perception of the operator. FIG. 5 schematically shows the front scenes of a vehicle approaching intersection 16 of FIG. 4 at different distances from the intersection, as perceived by the operator from the same head position. When approaching the intersection, the arrow turns from red (FIG. 5A) to yellow (FIG. 5B) to green (FIG. 5C). Due to the perspective, the arrow may move to the right while the vehicle is approaching. As can be seen, the image of the road of travel as perceived by the operator is not covered by any graphical representations. Yet the arrows clearly show in each section where the intended route goes and what the distance to the intersection is.

Figure 6:
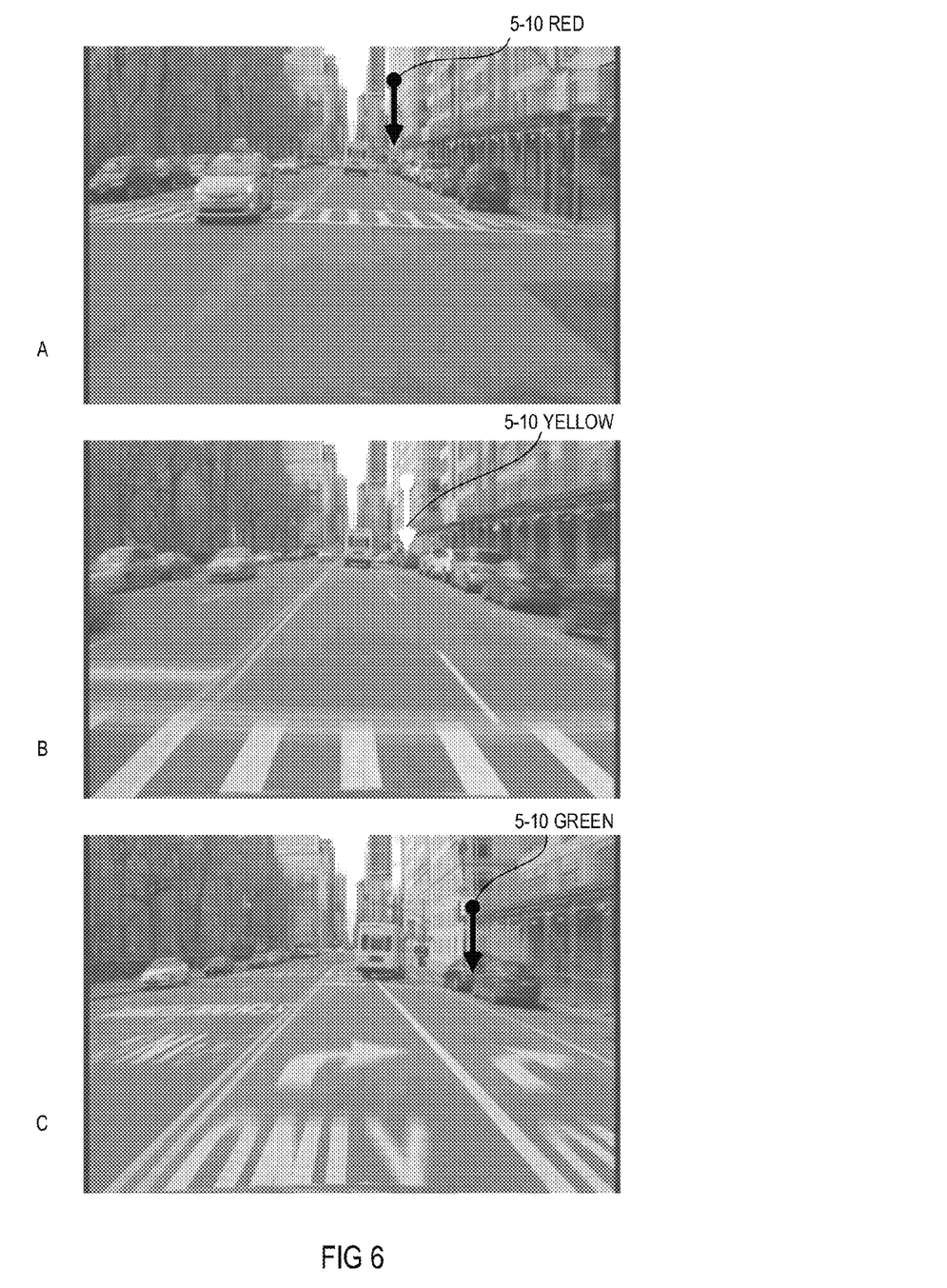
FIG. 6 is a series of three photographs in situations similar to the situations schematically shown in FIG. 5.

FIG. 6 shows a real-world scene similar in structure to the schematic scene depicted in FIG. 4, i.e., the vehicle is approaching an intersection, where it intends to turn to right. The vertical arrow follows the intersection and changes its color according to the distance to the intersection. The operator receives all important information without being disturbed or distracted by the displayed arrow.

Figure 7:
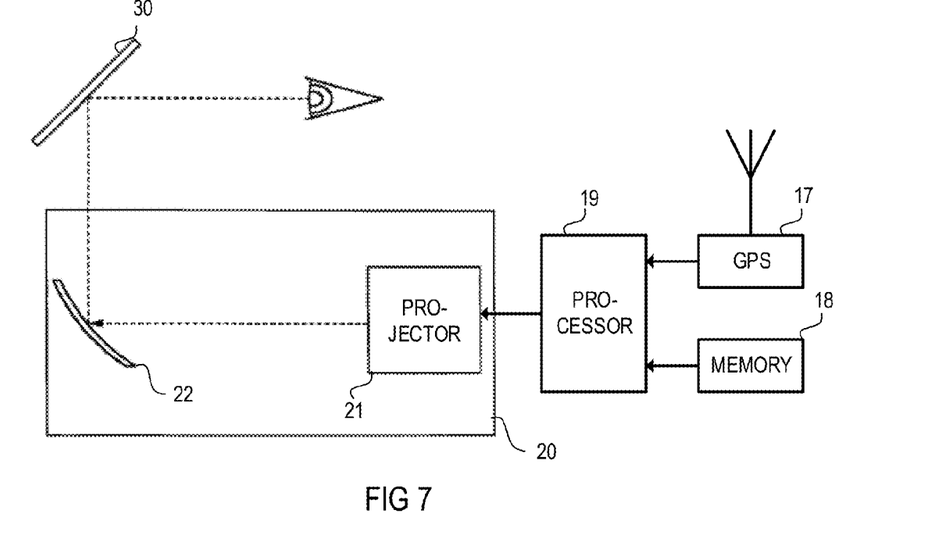
FIG. 7 is a block diagram illustrating an exemplary navigation system with heads-up display.

Referring to FIG. 7, a navigation system for a vehicle includes vehicle position data generator 17 for generating signals that indicate location and moving direction of the vehicle; scene information memory 18, which stores the scene information and provides information representative of the layouts of local environments at various locations; processor 19, which processes data from vehicle position data generator 17 and scene information memory 18; heads-up display projector 20; and reflecting layer 30, integrated in or fixed to the front glass of the vehicle. An environment scene generator (software) module in processor 19, using position data acquired from vehicle position data generator 17, acquires information from local scene information memory 18 representative of the local scene at the current vehicle position and the moving direction indicated by the position data and the moving direction data. The real environment scene generator generates location-pertinent information, which is used by processor 19 to calculate the position of the graphic pattern overlaid on the real-world scene to generate travel information corresponding to the target route. The overlaid patterns are constantly updated to reflect the changing locality as the position of the vehicle changes. Vehicle position data generator 17 may include a receiver that employs the global positioning system (GPS) to generate location and moving direction information. Based on the location and moving direction information, scene information memory 18 may provide a three-dimensional map from which processor 19 may generate a virtual view in the moving direction to determine the position of the light pattern on the front glass. Projector 20 may include image source 21 and diffusor mirror 22, which projects the output of the image source onto reflective layer 30 in/on the front glass.

The heads-up display, including projector 20 and reflecting layer 30, may display vertical arrows or other vertically extending light patterns of other two-dimensional navigation objects designed to convey en route guidance information to the operator. The patterns superimpose a pattern based on the desired route over the real terrain. The pattern may be combined with additional artificial speech messages.

Figure 8:
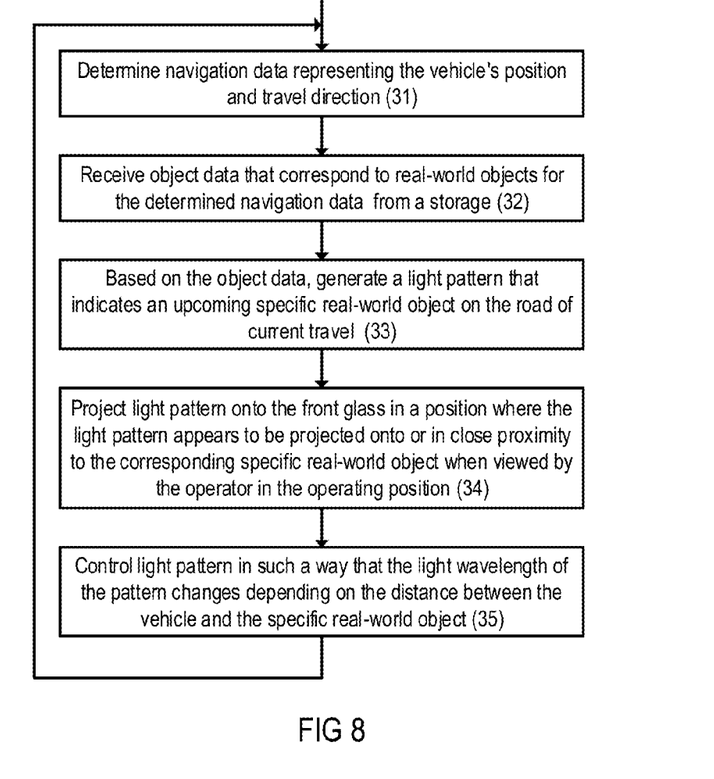
FIG. 8 is a flow chart of a method for guiding the vehicle through a road network.

As set forth above, a method of guiding a steerable vehicle through a road network, in which the vehicle has a front glass and an operating position from which an operator looking through the front glass steers the vehicle, may include the procedures described below. Navigation data representing the vehicle's position and travel direction may be determined (31). Object data that correspond to real-world objects for the determined navigation data are received from a storage (32) and, based on the object data, a light pattern that indicates an upcoming specific real-world object on the road of current travel is generated (33). The light pattern is projected onto the front glass in a position where the light pattern appears to be projected onto or in close proximity to the corresponding specific real-world object when viewed by the operator in the operating position (34). The light pattern is controlled in such a way that the light wavelength of the pattern changes depending on the distance between the vehicle and the specific real-world object (35).

Figure 9:
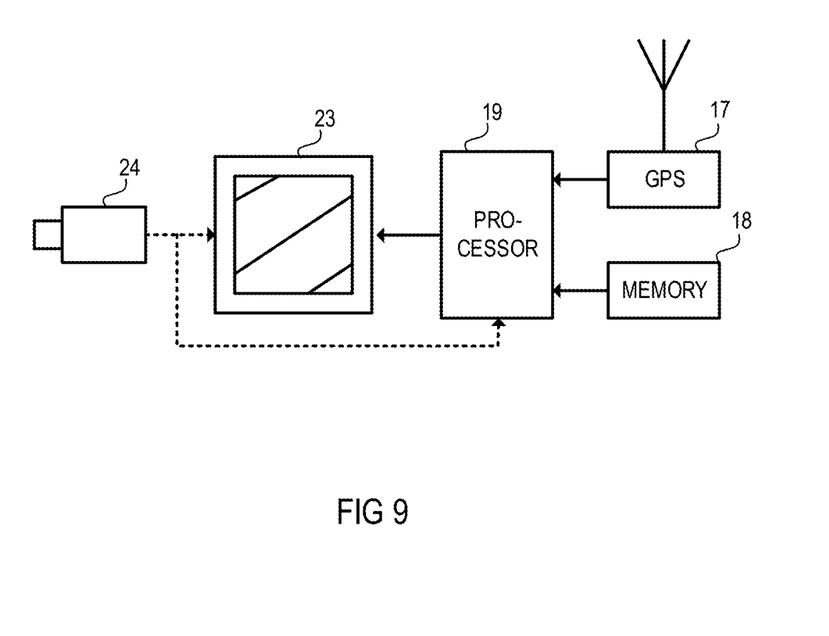
FIG. 9 is a block diagram illustrating an exemplary navigation system with screen.

Although the foregoing examples relate to systems with a heads-up display, alternatively or additionally common screens based on, e.g., liquid crystal displays, TFT displays, OLED displays etc., may be used for displaying guiding patterns. The screen may be part of a common infotainment or navigation system and used as a specific mode of operation in the manner described below. Referring now to FIG. 9, such a navigation system may include vehicle position data generator 17 for generating signals that indicate location and moving direction of the vehicle; scene information memory 18, which stores the scene information and provides information representative of the layouts of local environments at various locations; processor 19, which processes data from vehicle position data generator 17; and scene information memory 18 as described above in connection with FIG. 7. The system further includes a screen 23 which displays information provided by processor 19. The system may also include an image pick-up unit, e.g., a video camera 24, which is configured to generate a video image of the local environment in front of the car and, thus, may be arranged in the front portion of the vehicle. Camera 24 may provide video signals representative of the local environment in front of the vehicle directly or via processor 19 to screen 23.

The environment scene generator (software) module in processor 19, using position data acquired from vehicle position data generator 17, acquires information from local scene information memory 18 representative of the local scene at the current vehicle position and the moving direction indicated by the position data and the moving direction data. The real environment scene generator generates location-pertinent information, which is used by processor 19 to calculate the position of the graphic pattern overlaid on the (graphic or video) image of the real-world scene to generate travel information corresponding to the target route. The real environment scene generator may further generate a graphic, e.g., virtual image of the local environment in front of the car if no video signal is available. The overlaid patterns are constantly updated to reflect the changing locality as the position of the vehicle changes. Vehicle position data generator 17 may include a receiver that employs the global positioning system (GPS) to generate location and moving direction information. Based on the location and moving direction information, scene information memory 18 may provide a three-dimensional map from which processor 19 may generate a virtual view in the moving direction to determine the position of the graphic pattern on screen 23. The virtual view may be displayed if no video signal is available. The graphic, i.e., virtual image or the video image are superposed with the graphic pattern either in the screen 23 (e.g., its video processor) or in processor 19. While in the system of FIG. 7 the light pattern is optically superposed on the real world view at the front glass, in the system of FIG. 9 the superposition takes place electronically in processor 19 or display 23.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A method for guiding a steerable vehicle through a road network, wherein the vehicle has a front glass and an operating position from which an operator looking through the front glass steers the vehicle, the method comprising:

determining, via a vehicle position data generator, navigation data representing a position and a travel direction of the vehicle;

receiving, from a storage object, data corresponding to one or more real-world objects based on the navigation data;

generating a light pattern that indicates a first real-world object on the road of current travel based on the data from the storage object; and projecting the light pattern onto the front glass in a position where the light pattern appears to be projected onto or in close proximity to the first real-world object when viewed from the operating position, wherein the light pattern has a light wavelength that changes in accordance with the distance between the vehicle and the first real-world object.

2. The method of claim 1, wherein the light pattern has a shape with a vertical extension and a horizontal extension, and wherein the vertical extension is at least twice the size of the horizontal extension.

3. The method of claim 1, wherein the first real-world object comprises at least one of an upcoming intersection, a U-turn, a road exit, and a merging lane.

4. The method of claim 1, wherein the operating position is included in a plurality of different operating positions, and wherein the vertical extension is sufficiently large to allow the light pattern to superimpose the first real-world object in multiple different operating positions.

5. The method of claim 1, wherein the light wavelength of the light pattern changes gradually or in increments.

6. The method of claim 5, wherein the increments comprise a close distance range that includes the first real-world object, a far distance range, and an intermediate distance range that lies between the close range and the far range.

7. The method of claim 6, wherein the light wavelength of the light pattern allows the light pattern to appear green at distances within the close range, yellow at distances within the intermediate range, and red at distances within the far range.

8. The method of claim 5, wherein the increments change in accordance with vehicle speed.

9. A method for guiding a steerable vehicle through a road network, wherein the vehicle has a screen and an operating position from which the screen is visible to an operator steering the vehicle, the method comprising:

determining, via a vehicle position data generator, navigation data representing a position and a travel direction of the vehicle;

receiving, from a storage object, data corresponding to one or more real-world objects based on the navigation data;

generating on the screen a graphic image or video image of one or more real-world objects in front of the vehicle;

generating on the screen a graphical pattern that indicates a first real-world object on the road of current travel based on the data from the object; and superposing the graphical pattern on the graphic or video image in front of the vehicle at a position where the graphical pattern appears to be on or in close proximity to the image of the first real-world object, wherein the graphic pattern has a light wavelength that changes in accordance with the distance between the vehicle and the first real-world object.

10. The method of claim 9, wherein the graphical pattern has a shape with a vertical extension and a horizontal extension, and wherein the vertical extension is at least twice the size of the horizontal extension.

11. The method of claim 9, wherein the first real-world object comprises at least one of an upcoming intersection, a U-turn, a road exit, and a merging lane.

12. The method of claim 9, wherein the light wavelength of the graphical pattern changes gradually or in increments.

13. The method of claim 12, wherein the increments comprise a close distance range that includes the first real-world object, a far distance range, and an intermediate distance range that lies between the close range and the far range.

14. The method of claim 13, wherein the light wavelength of the graphical pattern allows the light pattern to appear green at distances within the close range, yellow at distances within the intermediate range, and red at distances within the far range.

15. The method of claim 12, wherein the increments change in accordance with vehicle speed.

16. A system configured to guide a steerable vehicle through a road network, wherein the vehicle has a front glass and an operating position from which an operator looking through the front glass steers the vehicle, the system comprising:

a vehicle position data generator configured to determine navigation data representing a position and a travel direction of the vehicle;

a memory configured to provide object data corresponding to one or more real-world objects based on the navigation data; and a heads-up display configured to generate a light pattern that indicates a first real-world object on the road of current travel based on the object data and to project the light pattern onto the front glass at a position where the light pattern appears to be projected onto or in close proximity to the first real-world object when viewed from the operating position, wherein the light pattern has a light wavelength that changes in accordance with the distance between the vehicle and the first real-world object.

17. The system of claim 16, wherein the light pattern has a shape with a vertical extension and a horizontal extension, and wherein the vertical extension is at least twice the size of the horizontal extension.

18. The system of claim 16, wherein the light wavelength of the light pattern changes gradually or in increments.

19. The system of claim 18, wherein the increments change in accordance with vehicle speed.

20. A system configured to guide a steerable vehicle through a road network, wherein the vehicle has a screen and an operating position from which the screen is visible to an operator steering the vehicle, the system comprising:

a vehicle position data generator configured to determine navigation data representing a position and a travel direction of the vehicle; and a memory configured to provide object data corresponding to one or more real-world objects based on the navigation data, wherein the screen is configured to generate a graphic pattern that indicates a first real-world object on the road of current travel based on the object data, and to superpose the graphic pattern on a graphic image or video image at a position where the graphic pattern appears to be on or in close proximity to the first real-world object, and wherein the graphic pattern has a light wavelength that changes in accordance with the distance between the vehicle and the specific real-world object.

21. The system of claim 20, further comprising an image pick-up unit that is configured to generate an image of the local environment in front of the vehicle.

22. The system of claim 20, wherein the graphical pattern has a shape with a vertical extension and a horizontal extension, and wherein the vertical extension is at least twice the size of the horizontal extension.

23. The system of any of claim 20, wherein the light wavelength of the graphic pattern changes gradually or in increments.

24. The system of claim 23, wherein the increments change in accordance with vehicle speed.

* * * * *